Oct. 31, 1950  R. M. HAMILTON  2,527,995
DEVICE FOR SUPPORTING MOVING VEHICLES ON WATER
Filed Feb. 19, 1943  8 Sheets-Sheet 1

Inventor
Ronald Marsden Hamilton
By Loyd Hall Sutton
Attorney

Oct. 31, 1950 R. M. HAMILTON 2,527,995
DEVICE FOR SUPPORTING MOVING VEHICLES ON WATER
Filed Feb. 19, 1943 8 Sheets-Sheet 2

Inventor
Ronald Marsden Hamilton
By Loyd Hall Sutton.
Attorney

Oct. 31, 1950  R. M. HAMILTON  2,527,995
DEVICE FOR SUPPORTING MOVING VEHICLES ON WATER
Filed Feb. 19, 1943  8 Sheets-Sheet 5

Inventor
Ronald Marsden Hamilton
By Loyd Hall Sutton.
Attorney

Oct. 31, 1950     R. M. HAMILTON     2,527,995
DEVICE FOR SUPPORTING MOVING VEHICLES ON WATER
Filed Feb. 19, 1943     8 Sheets-Sheet 6

Inventor
Ronald Marsden Hamilton
By Loyd Hall Sutton.
Attorney

Oct. 31, 1950     R. M. HAMILTON     2,527,995
DEVICE FOR SUPPORTING MOVING VEHICLES ON WATER
Filed Feb. 19, 1943     8 Sheets-Sheet 8

Inventor
Ronald Marsden Hamilton
By Loyd Hall Sutton.
Attorney

Patented Oct. 31, 1950

2,527,995

UNITED STATES PATENT OFFICE 2,527,995

DEVICE FOR SUPPORTING MOVING VEHICLES ON WATER

Ronald Marsden Hamilton, Farnham, England, assignor to Hamilton's Lilyflex Surfaces Limited, London, England, a British company Application February 19, 1943, Serial No. 476,462
In Great Britain May 28, 1941

8 Claims. (Cl. 14—27)

This application corresponds to the application of Ronald Marsden Hamilton, Serial No. 6,812/41, which was filed in Great Britain on May 28, 1941.

This invention comprises improvements in or relating to roads or trackways for aircraft and other vehicles. It is an object of the invention to provide a road or track or aerodrome surface which can be used over water, which can be quickly laid out and which is not readily damaged by hostile action.

Floating tracks such as pontoon bridges are well known but these depend for the weight which they can sustain upon the buoyancy of the pontoons and damage to one of the pontoons may sink a section of the track and thereby render the whole track useless. It has also been proposed to provide floating landing stages for use at sea but here again the buoyancy of the supports is relied upon for the support of the stage and of the vehicles upon it and such structures are vulnerable to hostile action either by bombs or by under-water attack as well as being of very great cost, dangerous if they drift from their moorings and not beyond the possibility of sinking when damaged by storms.

According to the present invention, a track, runway, or like area for supporting vehicles on water consists of a flexible self-buoyant floor, stiffened at the line or lines on which vehicles are to run so as to spread the load. The buoyancy of the floor according to the present invention is not necessarily sufficient to support the weight of the vehicles which may be used upon it when these are at rest. It is enough that the floor should be of an area adequate to spread the load as hereinafter explained, and have a buoyancy sufficient to support its own weight. If a vehicle travels over such a floor at sufficient speed it will be found, and may be mathematically proved, that the vehicle will not cause the floor to sink but will merely cause a temporary traveling depression in the floor surface which temporarily displaces the water below the floor and under proper conditions will not be sufficient to impede the vehicle. The floor may be stiffened in various ways. One way of stiffening it is by holding it in tension and this may be most readily effected along the lines of the runway or track. It may be stiffened transversely by wooden slats or boards, which may themselves form part of the structure of the floor.

Preferably the floor is made watertight, i. e. resistant to the passage of water through its substance, in such manner that the temporary travelling depression above referred to is kept clear or substantially clear of water and if the watertight area of the depression is made sufficient, even if a vehicle stops on the floor, it will support the vehicle owing to the displacement of the water effected by the depression. It will be appreciated that the depression, if the vehicle is stopped, will be greater than if it is travelling at an adequate speed.

An important application of the invention is to the crossing of rivers or other stretches of water. A floor stiffened transversely, laid across a river and held under tension at the ends will suffice to support a stream of heavy vehicles travelling at speed and the floor can readily be laid if necessary from one side of the water without preliminary access to the other side.

It has for example been found that a floor of canvas stiffened by transverse slats of wood and floating on the surface of a stream, the canvas being 7 feet wide, can support, without difficulty or appreciable depression in the water, a bicycle or a motor bicycle or a running pedestrian. The faster the vehicle travels, the greater its weight may be on a floor of given size.

Another important application of this invention relates to the launching of aircraft at sea or from other stretches of water. A floor in one form of the invention for this purpose consists of a large flexible self-buoyant floor of sufficient area to act as an aerodrome, or at all events as a runway or series of runways therefor, which is moored in a desired position and although flexible is sufficiently stiff to spread the load. Alternatively if a floor in the form of a runway of the kind described is towed behind a vessel it may be used for launching and alighting and will have the advantages of being located in the relatively calm water in the wake of the vessel and at sea level instead of at a great height as is the case on the deck of an aircraft-carrier; also of not being restricted in length and of being readily rolled up when not required for use so that a small vessel will suffice as an aircraft-carrier.

By providing suitable retarding means at the free end of the floor remote from the towing vessel, the whole floor can be held under substantial tension which further reduces interference by wave action.

Again, in a still further application of the invention, temporary repairs can be made to holes such as bomb holes in a roadway by filling the holes with water and covering them with a floor in accordance with the invention.

In order to assist in ensuring that the floor remains afloat even in the event of a heavy vehicle being accidentally stopped in the course of its travel over it, means may be provided to keep out water in the form of canvas or like walls at the edges of the floor.

Further features of the invention relate to means for permitting the rapid assembly of the parts, to means for ensuring watertight joints between the portions of the floor, to means for maintaining tension and to other features which will hereinafter appear.

The following is a description by way of example of certain constructions in accordance with the invention, reference being made to the accompanying drawings, in which Figures 1 to 10 relate to a form of bridge in accordance with the invention; Figures 11 to 15 to floating airfield constructions; and Figures 16 to 19 to a ship-to-shore or pier construction.

Figure 6:
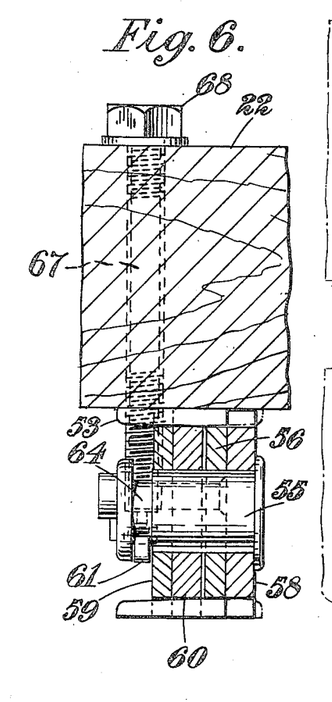
Figures 6 and 7 are details.
Figure 7:
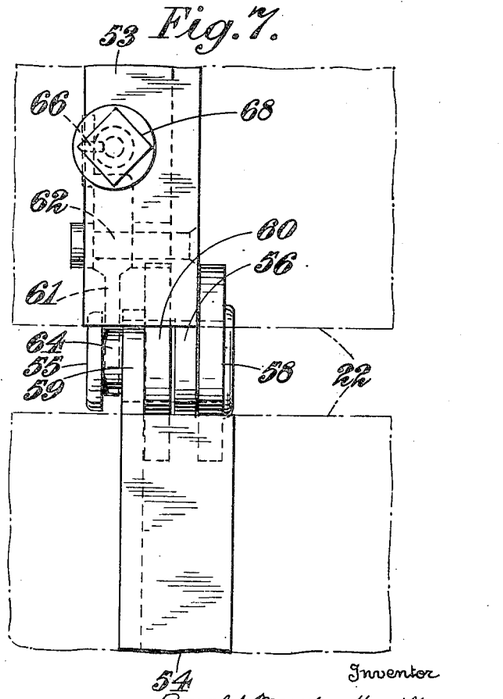
Figure 8:
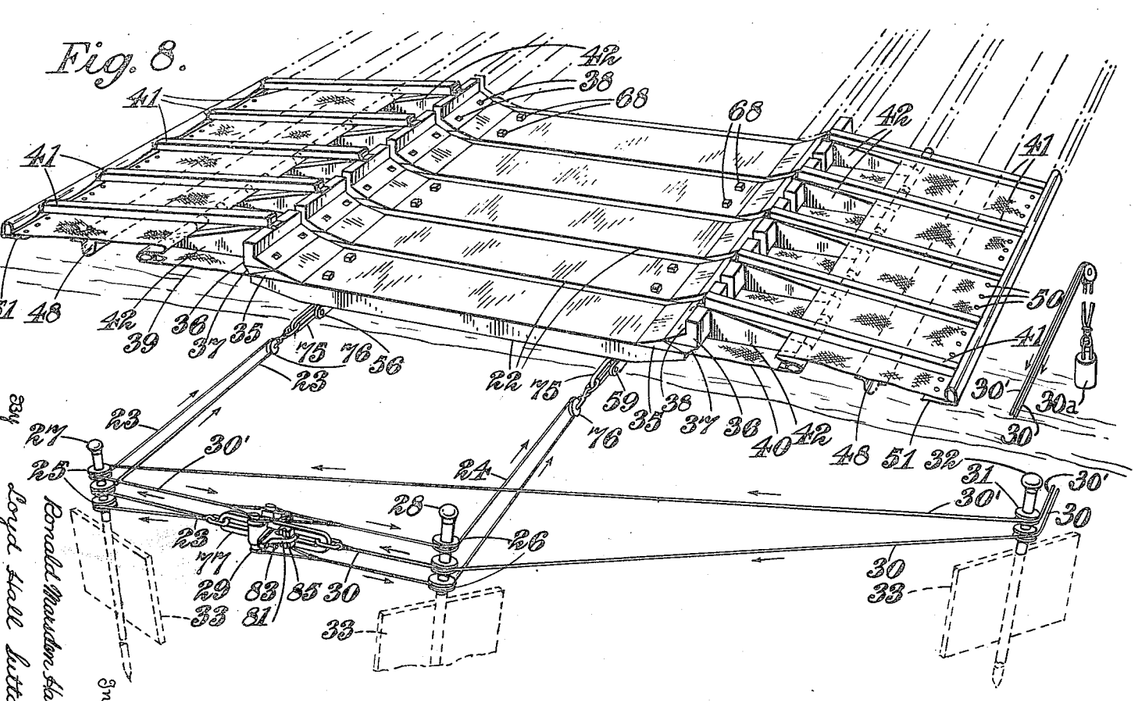
Figure 8 is a general perspective view showing the method of fixing the ends of the bridge.
Figures 9, 10:
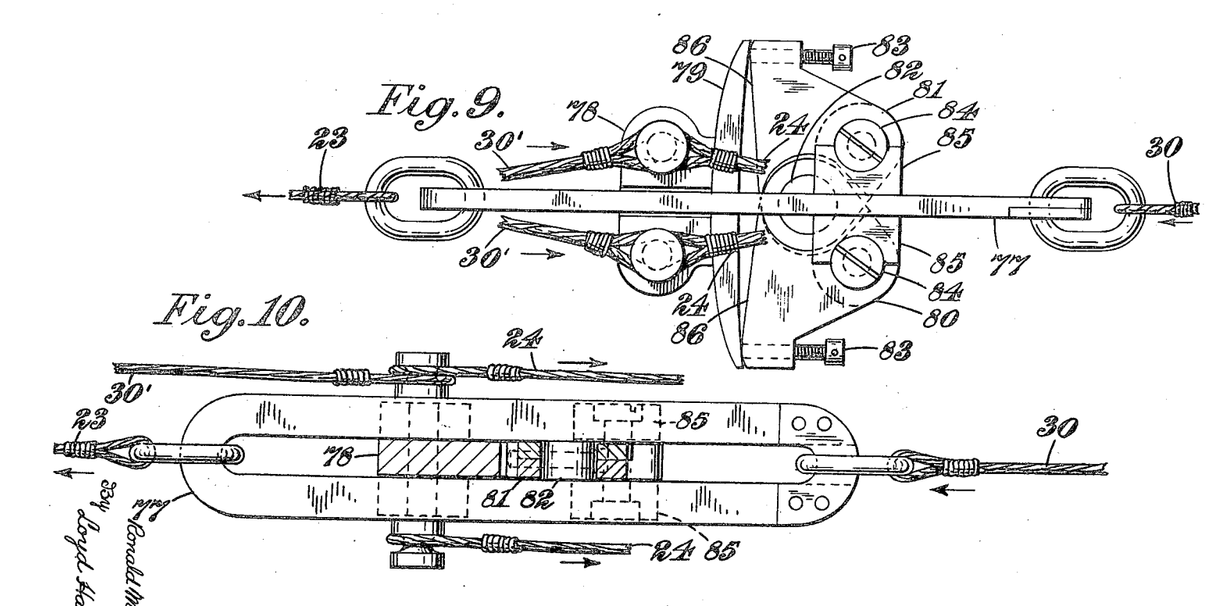
Figures 9 and 10 are details of the fixing means.

Referring to Figures 1 to 10 it is convenient to refer, in the first place, to the general perspective view shown in Figure 8. The bridge consists of a floor which is flexible in a longitudinal direction and capable of floating on water. The floor is made of wooden slats or planks 22 which extend transversely across the length of the floor and are hinged to one another as presently described. They are held in tension by cables 23, 24 which pass round pulleys 25, 26 on anchoring stakes 27, 28 and are secured to a tensioning device 29 from which pass cables 30, 30′ guided by pulleys 31 on a stake 32 to a counterweight 30a (see Figure 8). The stakes 27, 28 and 32 are driven into the banks of the river and their resistance to the pull of the cables may be stiffened by means of plates 33 buried in the ground or in any other way which is found desirable. The details of the tensioning device 29 are hereinafter explained.

The planks 22 each carry sections of wood screwed to them at their ends and built up to form a curb. The sections comprise triangular pieces 35 which afford a sloping lower portion to the curb side pieces 36 which afford an outer wall and triangular packing pieces 37 which support the pieces 36 in place. All these are secured by bolts 38. Between the lowermost packing pieces 37 and the ends of the planks 22 there are gripped the edges of canvas sides 39, 40 which project outwardly from the sides of the bridge and are secured at their outer edges to tension arms 41 which are hinged to the curb pieces 36. In this way the canvas sides are held in an outstretched position and their edges float on the surface of the water. If the bridge is depressed by a heavy load so that the planks 22 fall beneath the water level, the sides are carried upwards by the water and act as walls to keep the water out, as more clearly shown in Figure 1 where the position of the sides, when partly lifted by the water, is shown in chain line.

Figures 1, 2, 4:
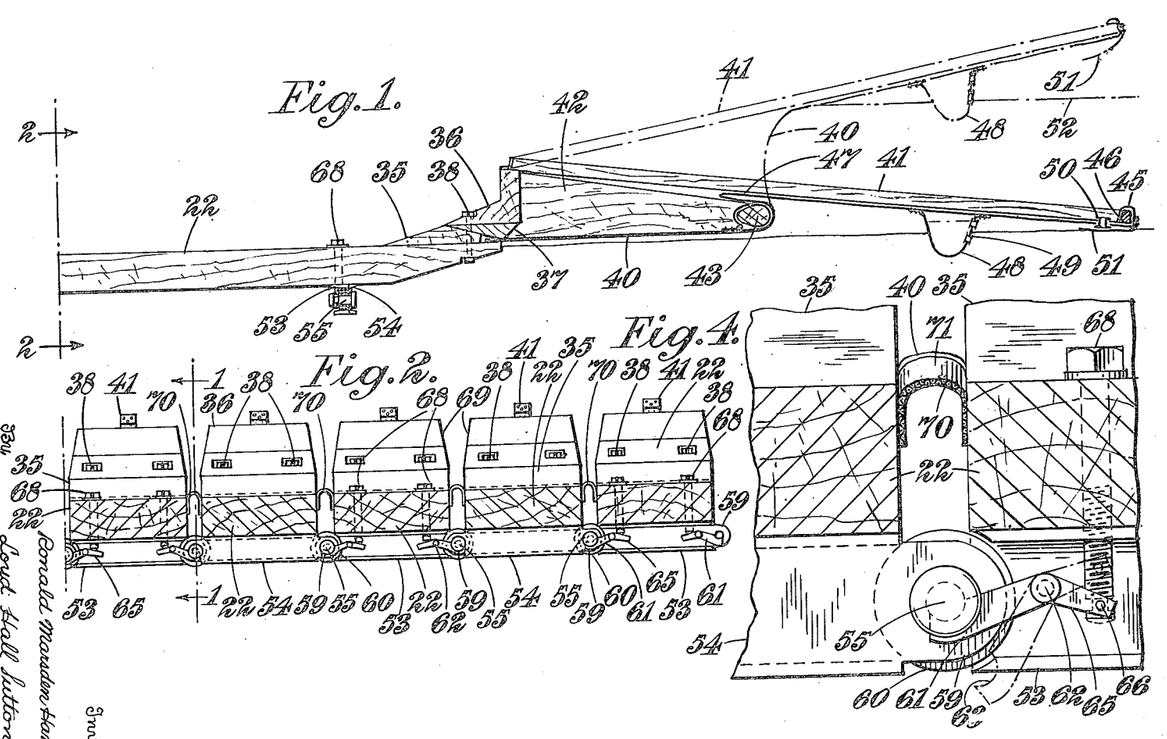
Figure 1 is a half-section transversely through a bridge upon the line 1—1 of Figure 2 looking in the direction of the arrows.
Figure 2 is a longitudinal section upon the line 2—2 of Figure 1 looking in the direction of the arrows.
Figure 4 is a detail.

The canvas sides 40 are held partially outstretched by brackets 42 which are rigidly secured to the curb pieces 36. The brackets 42 carry at their outer ends cross-pieces 43 and the ends of the cross-pieces fit into pockets 44, sewn in the canvas and shown in dotted lines in the plan, Figure 3, as well as more clearly in the detailed perspective, Figure 5. Beyond the brackets 42 there is a slackness in the canvas 40 up to its attachments to the ends of the hinged arms 41. The canvas is attached to the ends of the hinged arms by means of pockets 45, sewn in the outer edges of the canvas into which are entered cross-pieces 46 on the ends of the hinged arms. The slackness is shown in Figure 1 by the fold 47 in the canvas and it will be observed how this fold permits the arm 41 to rise when the water level on each side of the bridge rises relatively to the planks 22, the pressure of the water holding the canvas as far as possible close underneath the arm 41 but allowing it to connect with the portion which is underneath the brackets 42 by a hollow curve where it comes away from the bracket 41.

Along the underside of the canvas beneath the arms 41 there is sewn a longitudinal pocket 48 which hangs down and has apertures 49 by which it is kept full of water, thus weighting the canvas and preventing it from being blown up by gusts of wind. The upstanding portion at the edges of the canvas which is formed by the pockets 45 assists buoyancy and in order to keep the portion behind the pockets empty there are eyelet apertures 50 beneath which extends a canvas flap 51. When the edges of the side are beneath the water the flap 51 prevents the water getting in through the eyelets 50, but when the sides are raised and before the parts reach the height shown by the chain line 52 in the figure, the flaps 51 permit any water which has been trapped to drain out.

The planks 22 each have two channel irons 53, 54 secured to their underside. One channel iron 53 is fixed near the underside of one end of the plank and carries two pivot pins 55, which are rigidly secured into its two ends. The position of the pivot pins 55 is such that their axes are somewhat further apart than the width of the plank and the flanges of the channel iron are cut away where they coincide with the edges of the plank so as to leave only the web portion projecting as an ear 56 (Figures 6 and 7). In order to strengthen the ear a heavy washer 58 is welded to the back of the web portion of the channel iron at each end. The other channel iron 54 has similarly projecting ears 59 which are thickened by washers 60 welded in place. The ears 59 and washers 60 are bored out to receive the pins 55 of the corresponding channel members 53 on the neighboring plank. As can be seen by reference to Figure 3, the effect is that each plank has one channel member with ears 59, 60 forged to receive pivot pins and the other channel member on the same plank carries pivot pins. As a consequence every plank is similar to every other in the bridge.

Figure 3:
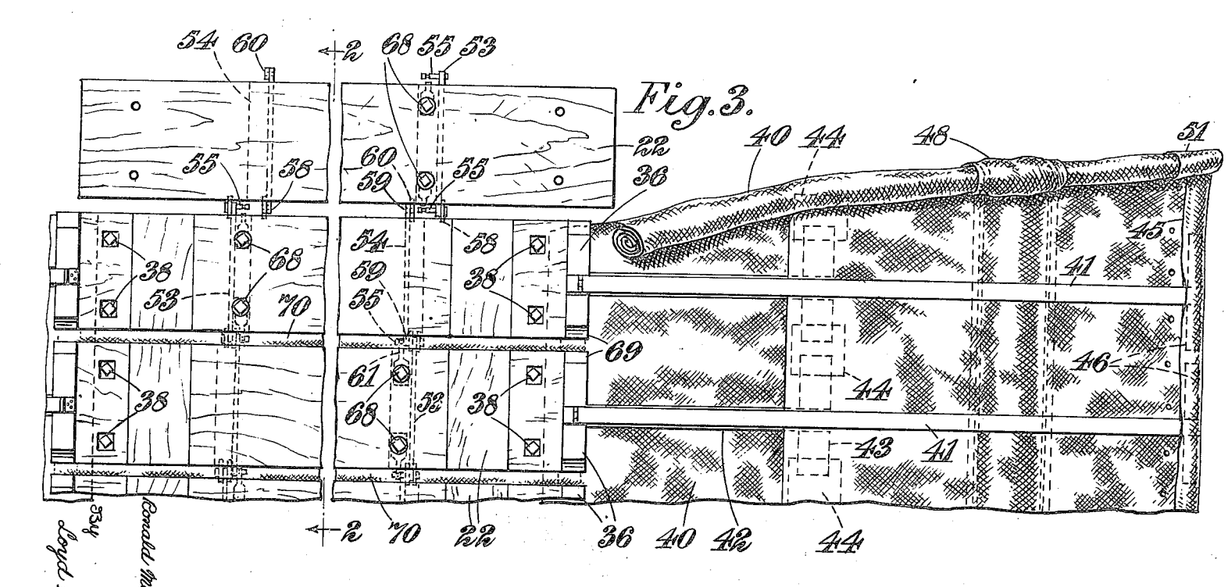
Figure 3 is a part plan.

In order to assemble the bridge, the planks are put together with the ends which carry the channel members having the pivot pins on them alternately to the left and to the right side of the bridge, and in assembling, a plank such as the one nearest to the top of Figure 3, is brought against the planks already assembled and the pins 55 are engaged in the ears 59 by sliding the plank to the left, as viewed in the figure. The next plank in the series will be assembled in reverse position and by sliding it to the right. During this assembling operation, the curb members 35, 36 and 37 are not in place, but as soon as a plank has been assembled the canvas 40 can be unrolled so that its edge overlies the end of the plank and the canvas can be secured in place by bolting down the curb members, which are of such shape that they are all three held in place at one end of the plank by the same pair of bolts 38.

Returning to the hinged joint connection, it is necessary not only that the pins 55 should be engaged in the ears 59 but also that they should be locked in place and the locking means are most conveniently seen in Figures 4 and 7. A lever 61 pivoted at 62 on the channel member 53 is so placed that a notch 63 in the end of the lever can swing into engagement with a groove 64 in the end of the pin 55. When so engaged the lever holds the pin from being withdrawn through the ear 59. The lever has a tail-piece 65 carrying a pin 66 which enters the groove cut near the bottom of a set-screw 67. The set-screw 67 passes through the plank and has a head 68 which projects slightly above the floor level formed by the upper surfaces of the planks. The set-screw 67 passes through the upper flange of the channel member 53 with screw-threaded engagement. Thus when the set-screw 67 is screwed down, a lever 61 will be brought into position, shown in full lines in Figure 4, and also in Figure 2, whereas when the set-screw 67 is unscrewed, the lever 61 will be withdrawn into the position shown in chain lines in Figure 4, where the lever is out of the way and the pin 55 is free to be withdrawn from the ear 59. There are two set-screws 67 in each channel member 53, serving to lock the pins 55 to the two planks on each side of the plank which carries them.

Figure 5:
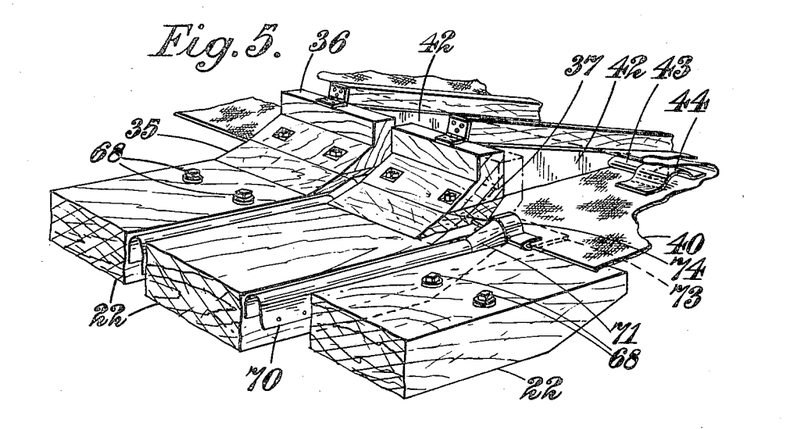
Figure 5 is a perspective view of a portion of the structure.

It will be observed that the planks are hinged together by the pins 55 along axes which extend parallel to the edges of the planks between these edges as viewed in plan and below them. Therefore the hinging movement which imparts longitudinal flexibility to the mat constituted by the planks, will vary the distance between the edges of the planks and a sufficient space needs to be left between them to give freedom for this movement. Furthermore the upper edges of the curb members 36 are bevelled off, as shown at 69, Figure 2, to allow for this freedom of movement. In order to prevent the ingress of water through the gaps between the planks, sealing flaps 70, best seen in Figure 5, are nailed along the edges of each plank. These flaps are made of canvas and are nailed to one edge only of each plank. The flaps are turned over and merely raised against the vertical surface of the adjoining plank against which they are pressed by water pressure so as to make a tight joint. In Figure 3 the flap has been omitted between the plank which is shown at the top of the figure and the one next to it so as to allow the pins 55 and the ears 59 to be easily seen, but it will be understood that the flap would actually be present.

At the ends of the joint between adjacent planks it is necessary to effect a watertight seal between the flaps 70 and the canvas 40. As shown in Figure 5 the flaps 70 at this end portion are each sewn to a connecting flap 71 which is of such a shape as to rise somewhat above the level of the top of the planks 22 and which carries, at the level of the top of the planks, a square 73 of canvas, part of which can underlie the adjacent part of the canvas 40. The square 73 has a free edge margin 74 which can be folded back over the top of the edge of the canvas 40 and the whole can thus be clamped in place by bolting down the curb members 35, 36 and 37.

The details of the tensioning device are as follows: The ears 56, 59 of the channel members 53, 54 of the end plank of the bridge are connected by links 75 to pulleys 76 around which pass the cables 23, 24. The two parts of the cable 23 pass around the pulleys 25 on the stake 27 to a long rectangular link 77 to which they are both secured. The cable 30 which is connected to the counter-weight is connected to the other end of this link and thus the counter-weight exerts direct tension on the bridge. On the other side of the bridge the two parts of the cable 24 which pass around the pulleys 26 are connected respectively to the upper and lower portions of a block 78. From the block 78 the cable 30' extends and passes round one of the pulleys 25 on the stake 27 and thence round the pulley 31 on the stake 32 to the counter-weight. The counter-weight therefore also exerts direct tension on the bridge through this connection. If an adequate tension to sustain a heavy load on the bridge were maintained solely by the counter-weight, however, a very heavy counterweight would be required, and to prevent this a frictional device is provided for interconnecting the block 78 with the link 77.

On the block 78 there is a stout transverse piece of steel plate 79 which is just sufficiently yielding to act as a very stiff spring. Two levers 80, 81 (best seen in Figure 9) are pivoted together by a pivot pin 82 and the ends of these levers bear on the ends of the spring 79. To localise the bearing, and to provide a measure of adjustment, the force between the levers 80, 81 and the spring 79 is transmitted by set-screws 83 carried by the levers. It will be noted that the levers and their joint by means of the pin 82 are made thin enough to lie in the slot of the link 77 and the block 78 itself passes through this slot. On each side of the link 77 the levers 80, 81 carry pins 84 which extend above and below the lever surfaces and serve as abutments against which bear brake-shoes 85 interposed between the pins 84 and the side faces of the link 77.

The effect is that, if the bridge tends to pull on the cables 23, 24 with a force which is greater than that which can be overcome by the counterweight on the cables 30, 30' the block 78 is pulled past the surface of the link 77 and the brake-shoes 85 rub on the side surfaces of the link. The friction tends to rotate the levers 80, 81 about their points of bearing on the spring 79 in such a direction that the brake-shoes are forced more firmly on to the side of the link and so the pressure on the brake-shoes builds up until the levers 80, 81 touch the spring 79 along their faces 86 which are nearest to the spring. Any greater amount of tension than this will lead to the block 78 slipping along the link 77 and allowing the bridge cables 23, 24 to pay out until the slack is sufficient to support the weight without further increase of tension. Any further load on the bridge would cause a little more paying out. As soon as the load is removed, however, the counter-weight draws the bridge back to its initial position. The brake shoes may be returned to their former position by hand or by any well-known and suitable mechanical connection between the shoes and the block 78.

The counter-weight itself may be of any desired form but conveniently it may take the form of a large canvas bucket partly dipping in the water of the river or other obstacle which has to be crossed and supported from a pulley on a tripod arranged in the river. The counter-weight bucket will therefore tend to keep itself filled but as tension comes on the bridge the bucket is lifted more and more out of the water and so applies more and more strain to the cables 30, 30'.

Although in the above description the assembly of a single plank to the bridge has been described, it will be understood that in the normal course groups of four or five planks would be assembled on the river bank and floated as rafts into place where they would be united with their neighbours. The buoyancy of the plank is sufficient to support a gang of men, although not a heavy vehicle, such as a tank. Therefore while one gang of men is assembling planks and uniting them with their neighbours another gang can follow and screw down the curb sections with the canvas and a third gang can follow with the arms 41 which can be engaged one at a time in the pockets 45 at the edge of the canvas and then screwed to the curb. In this way assembly can proceed rapidly. For the purpose of engaging the cross members 46 at the end of the arms 41 in the pockets, one end of each cross member is first pushed endwise into the pocket by pressure in one direction while the arm is held at a slight slant to its eventual position, then the other end of the cross member is brought within the pocket by swinging the arm 41 until it is square with the canvas and then the cross member is centralised in the pocket before the hinged end is screwed to the curb 36.

Figure 11:
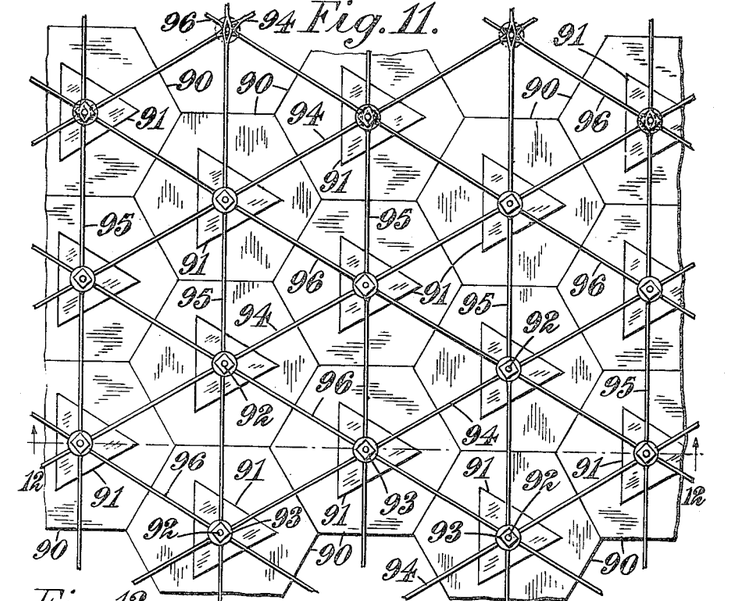
Figure 11 is an underside plan view of a floating airfield structure.
Figure 12:
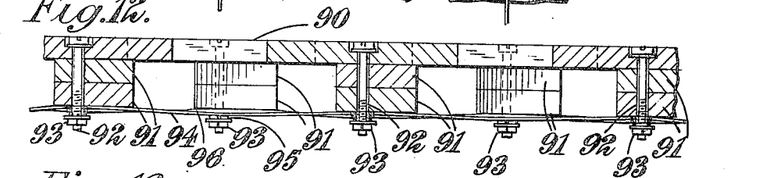
Figure 12 is a section on the line 12—12 of Figure 11.
Figure 13:
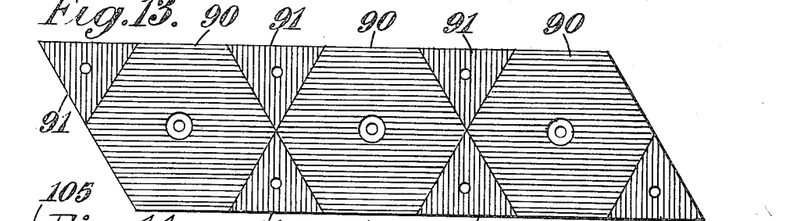
Figure 13 is a diagram showing the method of construction of the parts used in Figures 11 and 12.

Referring now to Figures 11 to 13 these show a construction of floating floor for an aerodrome. Only a section of the floor is shown. It consists of a large number of hexagonal pieces of wood 90. These may be about two inches thick and they each carry beneath them a stem-portion 91 made of two triangular blocks of wood of similar thickness secured to the head 99 by means of a bolt 92 and nut 93. These hexagonal units are all held together by a mesh of wires 94, 95, 96 on their underside, which mesh is constituted by three sets of parallel wires crossing one another at angles of 60 degrees and united at each crossing point by the bolts and nuts 92, 93. The wires are all stranded wire and are partly unstranded and eyeletted where they pass over the bolts. Such a construction can be extended as far as desired in any direction and the wires 94, 95, 96 can be made up in lengths which cover a certain number of sections, with an eye at each end and then commence again if necessary. Such a structure being mainly constructed of wood, will float of itself and as the hexagonal sections fit closely together and are prevented from moving apart by the wire mesh beneath them, it will only bend downwards, when a weight is placed upon it, with a somewhat slight radius of curvature. In other words the structure is stiffened sufficiently to spread the load although it remains flexible. Therefore aircraft can be launched across the surface and the weight of the aircraft is distributed over a large area of water, the whole forming a flexible mat. Watertightness between the sections can be assisted, if desired, by rubber joints, but it is not positively essential because the weight of an aircraft when alighting or arising rests on any particular part of the floor for a short period of time only. Around the edges of the aerodrome thus created there would preferably be erected a barrier or fence of canvas of a height sufficient to prevent the surface from being swamped by waves.

Figure 13 shows how the hexagons 90 and the triangles 91 can be cut from a single plank by making criss-cross cuts at intervals. By manufacturing in this way waste of wood is avoided.

Figures 14, 15:
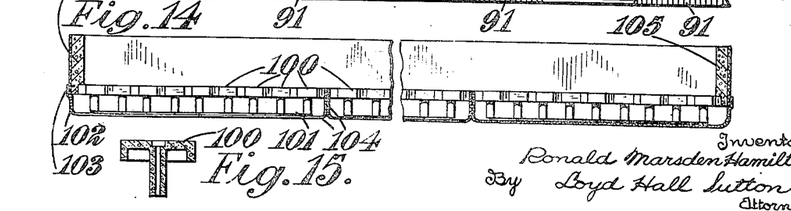
Figure 14 is a section through a modified construction.
Figure 15 is a detail of the construction illustrated in Figure 14.

If it is important to save timber, a structure similar to that of Figures 11 to 13 can be manufactured of moulded material such as concrete by using hexagonal mushroom shaped elements 100, as shown in Figures 14 and 15, each of which is made of concrete and is bolted to a wire mesh structure 101 beneath it, this structure being similar to that shown in Figure 11 (it will be borne in mind that Figure 11 is a view looking upwards from the underside). Below the wire mesh there is a layer of canvas 102, the edges of which extend upwardly around the sides of the aerodrome, as shown at 103. The canvas 102 is made in hexagonal sections and each section is bent up at the joints between the sections, as shown at 104, so that the sections are self-contained. In this way an aerodrome is built up of a large number of floating hexagonal sections. The edges will be somewhat irregular as they will follow the hexagonal lines, but they can be filled in, if desired, by semi-hexagons. Around the edges is an upstanding concrete wall 105.

It will be noted that one feature of the aerodrome surface described, is that the structure as a whole is not likely to be severely damaged by a bomb on any one part as the bomb will naturally pass through before exploding and the purely localised damage which would result, could be rapidly repaired by fresh sections. The same applies to the bridge structure above described.

While two constructions in accordance with the invention have been described in detail by way of example, it must be understood that many other constructions could also be employed and it is not in all cases necessary that so elaborate a construction of floor for the bridge, as that described in connection with Figures 1 to 10 should be provided. For light structures over narrow streams it has been found that a tarpaulin laid on the water with slats resting on it and made from the split chestnut spiles wired together (commonly used for making fences) will suffice to sustain light vehicles such as motor bicycles or even light cars, when driven at speed, and also running troops. Moreover, a floor, such as that of Figures 1 to 10, or another of lighter construction, could be unrolled behind a ship and towed along in the sea to provide a runway for aircraft.

Referring now to Figures 16 to 19, these show a further alternative construction which is intended for employment for the conveyance of vehicles from ship to shore.

Figure 17:
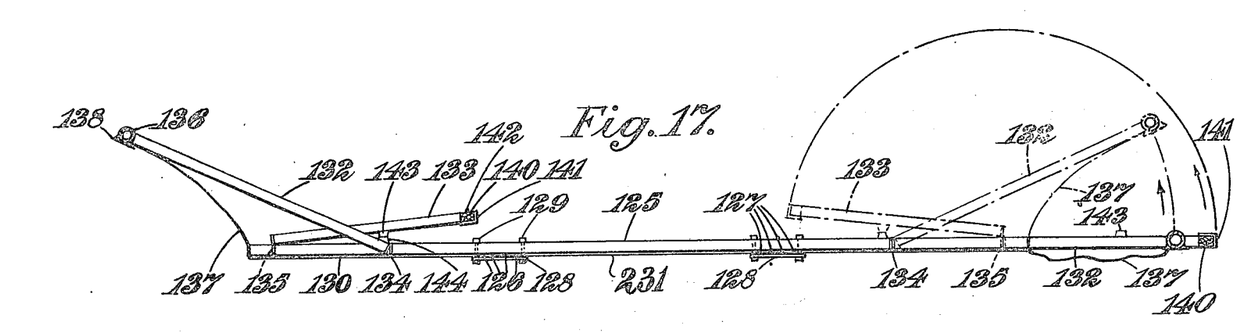
Figure 17 is a section upon the line 17—17 of Figure 16, looking in the direction of the arrows.
Figures 18, 19:
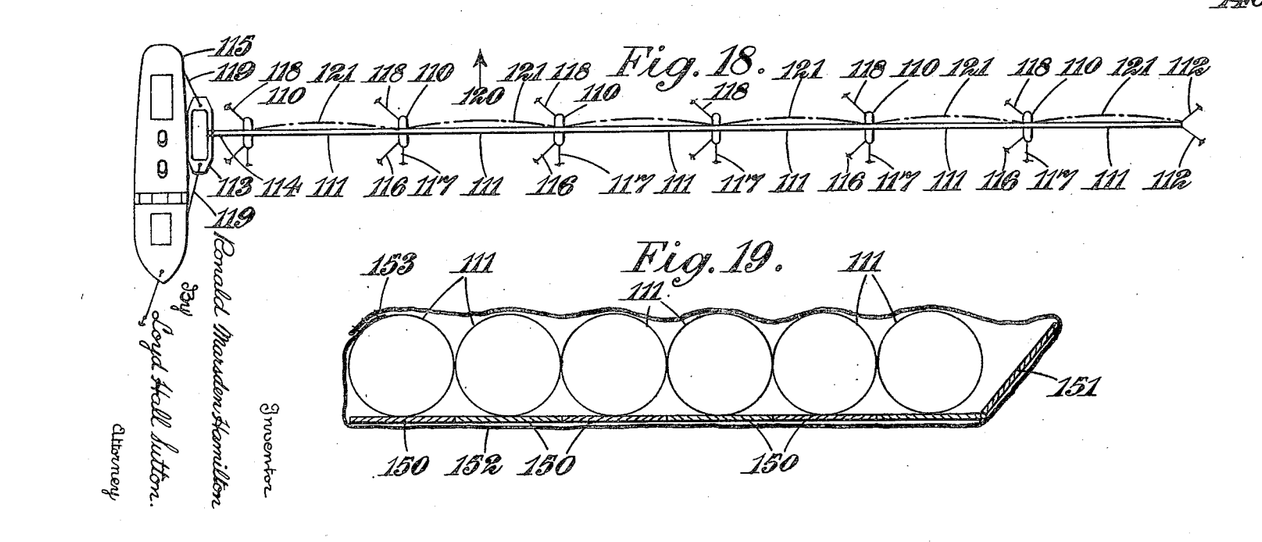
Figure 18 is a general plan of an assembly of a pier based on the construction of Figures 16 and 17.
Figure 19 is a longitudinal diagrammatic section of the parts of Figures 16 and 17 rolled up and stowed in a temporary barge for towing to a place of use.

In Figure 18, numerals 110 represent a number of anchoring points which might be small floats or even barges. Between each of the anchoring points there extends a runway 111 constructed in accordance with the present invention. This may take the form shown in Figures 16 and 17. At the shore end the end runway is anchored, as indicated at 112, to the shore so that vehicles coming along the runways can run straight up the beach. At the other end there is a barge 113 which contains in its hold a short length of runway mounted on a spindle and capable of being paid out at the side of the barge to any extent desired. This runway is shown at 114 and joins the deck of the barge 113 to the end anchoring point 110. The barge 113 forms a pier-head against which a ship 115 may be moored and from which vehicles may be delivered on to the barge 113 and thence along the runways 111 to shore. Each of the anchoring floats 110 is secured by cables, such as are indicated at 116, 117, 118, to anchors in the sea which are disposed in such manner as may be found advisable having regard to local currents, the set of the tide and so forth, in order to secure the floats 110 in position. The barge 113 is also secured by cables 119 to anchors. If the tide sets along shore in a direction such as is indicated by the arrow 120 the runways 111 will tend to bow, as indicated by chain lines 121 and thereby will draw the runway as a whole somewhat together so that the distance between the barge 113 and the end anchoring point 110 increases. To allow this movement without overstraining the runways, it may be necessary to pay out cable on the cables 116, 118. In order to allow for the varying distance between the anchoring float 110 and the barge 113 the length of runway 114 which, as above explained, is partly stowed in the hold of the barge 113, is paid out or taken in as required by suitable gear on the barge 113. It will be understood that the barge 113 is so constructed that the runway emerges from its side close to deck level and the deck level is made to slope down so that at this point it is not much above the waterline and thereby the vehicles can be driven directly on to the runway 114. At the anchoring floats 110 the runway is made to coincide with the portion of the decks of the floats which lies in the path of the runway.

Figure 16:
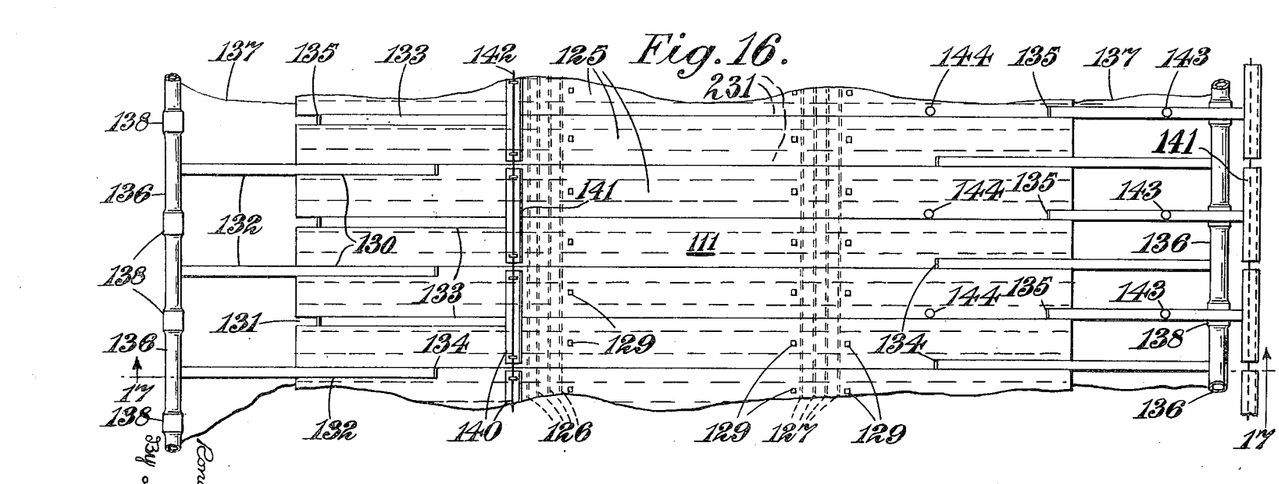
Figure 16 is a plan of a part of a further construction.

The construction of the runway 111 is as follows: A number of wooden slats or planks 125 are laid side by side above flexible steel cables 126, 127. The cables are clamped to the undersides of the planks by means of clips 128 and bolts 129. As will be seen there are two sets of cables one towards the left-hand and the other towards the right-hand side of the runway and these are disposed so that they come directly under the wheels of the vehicles for which the runway is to be used. There may be several cables underlying each side so as to increase the strength and flexibility of the construction.

The planks 125 extend for some distance each side of the cables 126, 127 and they are notched out on opposite sides of each end as indicated at 130, 131, to receive hinged arms 132, 133 which are secured to them by hinges 134, 134 respectively. The arms 132, when the runway is in use, extend upwardly and outwardly as shown on the left-hand side of Figure 17. They carry at their ends floats 136 which can be of inflated india-rubber or of canvas filled with some light material such as cork or kapok. From the floats 136 to the ends of the planks there extends in a continuous length along the side of the runway a connecting flap of canvas 137. The floats 136 are circular in cross-section and they are joined together by flattened portions 138 the purpose of which will hereinafter appear.

Intermediately between the locations of the hinged arms 132 are the arms 133. These arms, as can be seen in the drawing, are shorter and are hinged nearer to the ends of the planks 125. They are intended, when the runway is in use, to slope inwardly and slightly upwardly as shown on the left-hand side of Figure 17 and to carry cross members 140 which may be shod with angle plates 141 and which are all joined together by a steel cable member 142 which in the normal position of the members connects their upper sides.

The curb members 140 are supported at such a distance above the level of the planks 125 as to form a curb which will engage the tires of vehicles passing over the runway and will help to guide the vehicles. The correct height for the best performance in this respect may be determined experimentally and the curb is held at the correct height by means of packing blocks 143 secured to the arms which abut against other packing blocks 144 secured to the planks.

The joints between the planks are made waterproof in any desired way, for example strips of canvas or rubber 231 may be nailed across the joints at the underside of the planks and additionally secured by waterproof glue.

The construction described is similar on both sides of the runway and thus there are two of the curbs 140 and two sets of arms 132 with canvas 137. The parts on the right-hand side of Figure 17 are shown in the corresponding position in chain lines. They can, however, be folded out flat as shown in full lines on the right-hand side of the figure and it will be noted that the hinges are so disposed that in this position the arms 132, 133 fall into the same plane as the planks 125. The arms 133 in this position lie in the flat places 138 between the floats 136. If both sides of the runway are opened out flat in this manner it will, when there is no vehicle upon it, lie like a raft on the surface of the water and owing to the flexibility of the connections between the planks it can be rolled up.

For the purpose of transport it is intended that the six sections of runway shown in Figure 18 should each be rolled up, as shown in iFgure 19, the sections being shown at 111, Figure 19.

For rolling up the sections 111 it is obvious that the weight would be considerable, running to many tons. The rolling up of the sections is therefore conveniently done while they are floating in water.

Each of the rolled sections is accommodated on a raft 150, the rafts 150 being hingedly connected together. There is an additional raft 151 at one end and all the rafts are made to overlie a sheet of canvas 152. The sheet of canvas 152 is made large enough to be folded up around the end of the rolls 111 and it can be wrapped over the top and appropriately secured, as indicated at 153. The canvas wrapping can be emptied of water by blowing in air and the whole construction forms a flexible barge which can be towed to the site where it is intended to extend the runway in the manner shown in Figure 18. The canvas being then undone, the rolls 111 can be rolled off one at a time, floated into place and unrolled over the surface of the water as they are sufficiently buoyant for this purpose when no load is being carried.

The runway only sinks into the water into the position shown in Figure 17 on the left-hand side of the figure, when the load of a vehicle is actually passing over it and therefore, normally, the runway will drain itself dry in spite of a certain amount of possible leakage through the canvas.

The rafts 150 may be detachable from one another and permanently secured to one end of each of the rolls 111, if desired, in which case the rafts 150 act as the floats 110 and separate floats are not required at the anchoring points.

The provision of the curbs 140 makes the runway act as a track which automatically guides vehicles passing over it and therefore ensures that a stream of vehicles can be run over it even in the dark without leaving the track and without imposing any burden of steering upon the operators of the vehicles.

I claim:

1. A device for supporting moving vehicles on water, the buoyancy of said device being insufficient to support the static weight of the vehicles, said device including a floor comprising individually stiff buoyant members each member extending transversely across the device, connecting means joining said members flexibly together in spaced apart relation longitudinally of the floor, lateral weight supporting means rigidly connected with and extending outwardly beyond each end of each buoyant member, said supporting means being spaced above a projection taken from the bottom portion of the buoyant members thereby furnishing additional surface for displacing water when the floor is under load, and flexible sealing means extending between the buoyant members and adapted to cooperate with them for preventing passage of water therebetween, and holding means secured to the floor and maintaining the floor under substantially constant tension in the longitudinal direction.

2. A device for supporting moving vehicles as claimed in claim 1 in which the lateral weight supporting means includes continuous flexible fabric sides sealing the said supporting means against the entrance of water, and in which struts hingedly extend from the buoyant members outwardly beyond the ends of the lateral weight supporting means into engagement with the fabric sides for supporting said sides against external water pressure.

3. A track for supporting moving vehicles on water, the buoyancy of said track being insufficient to support the static weight of said vehicles, said track comprising in combination a series of transversely extending, individually stiff buoyant members each of which member extends across the track, flexible connecting means joining said buoyant members together side by side longitudinally of the track while permitting angular movement relatively to one another, individual curb means removably secured to and extending above each end of each buoyant member, rigid extension members connected to each end of each buoyant member and projecting outwardly beyond the curb means, said extension members being spaced above a projection taken from the bottom portion of the buoyant members thereby furnishing additional surface for displacing water when the track is overloaded, flexible sealing means connected with and extending between adjacent buoyant members and sealing the spaces between the buoyant members to prevent passage of water therebetween, and tensioning means secured to the connecting means uniting the buoyant members and maintaining the track under such tension in the longitudinal direction so as to permit depression of the portion of the floor under the moving vehicle and to cause the displacement of a moving wall of water beneath the forward end of the depression transversely across the path of the moving vehicle whereby the vehicle is supported on the water due to the combined effects of the buoyancy of the track, the applied tension and the resistance to displacement of the moving wall of water.

4. A device for supporting moving vehicles on water, the buoyancy of said device being insufficient to support the static weight of said vehicle, said device comprising in combination a series of stiff wooden planks each of which extends transversely of the device, flexible ties uniting said planks side by side in spaced apart relation longitudinally of the device while permitting angular movement relatively to one another, means connected to the planks and sealing the spaces between adjacent planks to prevent free passage of water therebetween, curb means connected with and extending above the planks at each end thereof, supporting means rigid with the planks extending outwardly beyond the curb means and spaced above a projection taken from the bottom portion of the planks to provide additional buoyant support laterally at each side of the planks, and tensioning means secured to the flexible ties maintaining the device under such tension in the longitudinal direction so as to permit depression of the portion of the floor under the moving vehicle and to cause the displacement of a moving wall of water beneath the forward end of the depression transversely across the path of the moving vehicle whereby the vehicle is supported on the water due to the combined effects of the buoyancy of the device, the applied tension and the resistance to displacement of the moving wall of water.

5. A track as claimed in claim 3 in which the extension members include a continuous fabric supported longitudinally of the track and forming a bottom sealing surface of the extension members and in which struts are secured to the fabric and hingedly connected to the curb means for supporting the fabric against external water pressure.

6. A track as claimed in claim 3 wherein the curb means consists of curb sections carried on arms hinged to ends of the transverse buoyant members such that they may be moved outwardly into line with the said members to permit the track to be rolled up.

7. A track for supporting moving vehicles on water as claimed in claim 3 wherein the tensioning means comprises cables secured to the connecting means at one end thereof, a counterweight secured to the cables, means for guiding the cables to the counterweight and anchoring means at the opposite end of the track.

8. A track for supporting moving vehicles on water as claimed in claim 3 wherein the flexible connecting means uniting the transverse buoyant members comprises pairs of interfitting female hinge members, each pair being secured one upon each of two adjacent buoyant members and readily detachable hinge pins connecting said hinge members whereby said members may be floated into position and readily secured together while floating in the water.

RONALD MARSDEN HAMILTON.

REFERENCES CITED

The following references are of record in the file of this patent:

UNITED STATES PATENTS

| Number | Name | Date |
|---|---|---|
| 146,426 | Borgfeldt | Jan. 13, 1874 |
| 464,962 | Flynn | Dec. 15, 1891 |
| 951,379 | Norman | Mar. 8, 1910 |
| 1,073,794 | Christensen | Sept. 23, 1913 |
| 1,885,889 | Beam | Nov. 1, 1932 |
| 2,110,966 | Weichardt | Mar. 15, 1938 |
| 2,160,449 | Weichardt | May 30, 1939 |

FOREIGN PATENTS

| Number | Country | Date |
|---|---|---|
| 12,968 | Great Britain | Feb. 12, 1850 |
| 5,242 | Great Britain | Mar. 21, 1884 |
| 115,104 | Germany | of 1900 |
| 44,636 | France | Dec. 15, 1934 |